United States Patent [19]
Yamamoto

[11] Patent Number: 5,418,816
[45] Date of Patent: May 23, 1995

[54] AUTOMATIC EQUALIZER

[75] Inventor: Takeshi Yamamoto, Tokyo, Japan

[73] Assignee: NEC Corporation, Tokyo, Japan

[21] Appl. No.: 200,663

[22] Filed: Feb. 23, 1994

[30] Foreign Application Priority Data

Feb. 23, 1993 [JP] Japan .................. 5-033634

[51] Int. Cl.⁶ .............. H03H 15/00; H03H 7/40
[52] U.S. Cl. .............. 375/230; 364/724.16; 333/18; 375/233
[58] Field of Search ................. 375/11–14, 375/96, 99, 101; 364/724.11, 724.16, 724.19, 724.2; 333/18, 28 R

[56] References Cited

U.S. PATENT DOCUMENTS

| | | | |
|---|---|---|---|
| 4,972,433 | 11/1990 | Yamaguchi et al. | 375/12 |
| 5,230,006 | 7/1993 | Kurakami | 375/14 |
| 5,313,411 | 5/1994 | Tsujimoto | 364/724.19 |
| 5,327,458 | 7/1994 | Yamamoto | 375/12 |

FOREIGN PATENT DOCUMENTS 58-196713 11/1983 Japan .

OTHER PUBLICATIONS

K. Okanoue et al., "New Equalizing System for Super Multilevel QAM", B-929, 1989 Spring Nat'l Con. Record, The Inst. of Electronics, Information and Communication Engineers; Mar. 28–31, Higashi–Osaka, Japan.

K. Watanabe, "Adaptive Matched Filter and Its Significance to Anti–Multipath Fading", 46.2, International Conference on Communications '86, IEEE, Jun. 22–25, 1986, Toronto, Canada.

M. Muroya et al., "Automatic Equalizing of Time Domain", 6.1.2, Digital Radio Communication, Dig. Comm. Series: pub. Sangyo-Tosho Co., Ltd. Tokyo, Japan: 1st ed., Aug. 1985, pp. 122–127.

Primary Examiner—Stephen Chin
Assistant Examiner—Young Tse
Attorney, Agent, or Firm—Sughrue, Mion, Zinn, Macpeak & Seas

[57] ABSTRACT

An automatic equalizer is used in a radio transmission path for improving convergent characteristics of a control loop in an automatic equalizing mode when the amplitude ratio of reflected and direct waves is greater than 1. The automatic equalizer has an adaptive matched filter, a decision feedback equalizer, and a reset control circuit for outputting first and second reset signals, respectively, to the adaptive matched filter and the decision feedback equalizer when an asynchronous condition is detected. After the first and second reset signals are generated, thereby resetting the adaptive matched filter and the decision feedback equalizer simultaneously, the first reset signal is eliminated before the second reset signal is eliminated. The decision feedback equalizer is thus brought into the automatic equalizing mode after the adaptive matched filter has entered the automatic equalizing mode and symmetrized impulse responses.

4 Claims, 5 Drawing Sheets

AUTOMATIC EQUALIZER

BACKGROUND OF THE INVENTION

1. Field of the Invention

The present invention relates to an automatic equalizer for use in a digital radio communication system, and more particularly to an automatic equalizer composed of an adaptive matched filter and a decision feedback equalizer, for eliminating intersymbol interference due to multipath fading in radio communications.

2. Description of the Related Art

One problem with conventional digital radio communication systems has been the degradation of radio circuit quality due to frequency selective fading that occurs in the transmission path. To solve this problem, there has been proposed a digital radio communication system including a receiver which is composed of an adaptive matched filter and a decision feedback equalizer (see K. Okanoue et al.: "New Equalizing System for Super Multilevel QAM", IEICE 1989 Spring National Convention Record, B-929, the Institute of Electronics, Information and Communication Engineers).

If the ratio of the amplitude of a delayed wave, which is a reflected wave, to the amplitude of a preceding wave, which is a direct wave, is represented by $\rho$, then the decision feedback equalizer has fading equalizing characteristics for two-wave interference such that when $\rho < 1$, it can sufficiently equalize intersymbol interference, but, when $\rho > 1$, its fading equalizing characteristics are poorer than when $\rho < 1$. It is known that the equalizing capability of the decision feedback equalizer is low in a case in which a preceding wave arrives earlier than a direct wave (see M. Muroya and H. Yamamoto: Chapter 6 of "Digital Radio Communications"0 published by Sangyo-Tosho Co., Ltd. 1985).

To improve the equalizing characteristics at the time $\rho > 1$, it has been proposed to place the adaptive matched filter so as to precede the decision feedback equalizer.

FIG. 1 of the accompanying drawings shows a fundamental circuit illustrative of the operating principles of the adaptive matched filter.

For transmitting pulses over a band-limited transmission path without causing intersymbol interference in digital radio communications, the impulse response of the entire transmission path must usually be zero, except for the central peak, at each interval T, as shown in FIG. 2(A) of the accompanying drawings. However, when the transmission path includes two paths, one for a direct wave and one for a reflected wave, these waves interfere with each other, causing multipath fading. If the amplitude of the reflected wave is greater at this time than the amplitude of the direct wave, i.e., $\rho > 1$, the reflected wave becomes a principal wave, and the direct wave that arrives earlier than the reflected wave becomes an interfering wave, with the result that a large intersymbol interference is produced when $t = -T$ as indicated by the impulse response of the transmission path as shown in FIG. 2(B) of the accompanying drawings. In FIG. 3(A) of the accompanying drawings, the principal wave $r_0 (= a(m))$ and the intersymbol interference $r_{-1} (= a(m+1))$ at the time $t = -T$ are indicated by the corresponding arrows. When the principal wave $r_0$ and the intersymbol interference $r_{-1}$ are delayed by T, they are indicated by the corresponding arrows in FIG. 3(B) of the accompanying drawings.

For the sake of brevity, a 2-tap transversal filter 102 comprising a delay circuit 6, multipliers 7, 8, and an adder 9 as shown in FIG. 1 will be considered. An input signal $S_0$ is represented as shown in FIG. 3(A), and a signal $S_1$ is represented as shown in FIG. 3(B). At this time, an output signal $S_2$ from the adder 9 can be given as follows:

$$S_2 = \alpha \times S_0 + \beta \times S_1.$$

If $\alpha = 0.9/1.9$ and $\beta = -1/1.9$, the output signal $S_2$ can be expressed by:

$$S_2 = (0.9/1.9) \times S_0 + (-1/1.9) \times S_1.$$

Therefore, the output signal $S_2$ is represented as shown in FIG. 3(C). Consequently, after the input signal $S_0$, which has been subjected to the large intersymbol interference $r_{-1}$ due to the leading wave as shown in FIG. 3(A), has passed through the transversal filter 102 with the tap coefficients $\alpha$, $\beta$, the intersymbol interference is dispersed into intersymbol interferences $r_{-1}$, $r_1$ that are symmetric with respect to the principal signal $r_0$ ($t=0$). It should be noted that the magnitude of the dispersed intersymbol interferences $r_{-1}$, $r_1$ is about half of the magnitude of the intersymbol interference $r_{-1}$ before it is dispersed.

Consequently, while the decision feedback equalizer alone, denoted at 201 in FIG. 1, is unable to equalize the intersymbol interference $r_{-1} = 0.9$ of the signal $S_0$, the combination of the decision feedback equalizer 201 and the transversal filter 102 that precedes the decision feedback equalizer 201 can sufficiently equalize the intersymbol interference of the above magnitude because the intersymbol interference $r_{-1}$ is of a magnitude $r_{-1} = 0.9/1.9 = 0.47$ and the intersymbol interference $r_1$ is of a magnitude $r_1 = 1/1.9 = 0.53$. The transversal filter which functions in the manner described above is also referred to as a matched filter. Thus, the adaptive matched filter and the decision feedback equalizer in combination are capable of improving equalizing characteristics when $\rho > 1$.

The automatic equalizer is reset intermittently so that the control loop in the automatic equalizer of the above arrangement converges when the control loop diverges.

FIG. 4 of the accompanying drawings illustrates a conventional automatic equalizer. An analog baseband signal supplied from a demodulator (not shown) is inputted from an input terminal 1, and sampled and quantized into a first digital signal series by an analog-to-digital (A/D) converter 4. The first digital signal series is supplied to an adaptive matched filter 101, which supplies a second digital signal series with symmetrized impulse responses to a decision feedback equalizer 201. The decision feedback equalizer 201 outputs a third digital signal series free of intersymbol interference from an output terminal 3.

An asynchronism-detected signal supplied from the demodulator is inputted from the input terminal 2 to a reset control circuit 302, which outputs a reset signal C. During a synchronous period in which the control loop converges, the reset signal C controls the adaptive matched filter 101 and the decision feedback equalizer 201 to operate in an automatic equalizing mode. During an asynchronous period in which the control loop diverges, the reset signal C intermittently resets the adaptive matched filter 101 and the decision feedback equalizer 201, as shown in FIG. 5 of the accompanying drawings. Therefore, if the control loop cannot converge when the adaptive matched filter 101 and the decision feedback equalizer 201 are brought into the automatic equalizing mode for a certain time in the asynchronous period, the adaptive matched filter 101 and the decision feedback equalizer 201 are reset and then returned to the automatic equalizing mode again. Such a process is repeated until the synchronous condition is reached. See Japanese patent laid-open No. 196713/1983.

In the conventional automatic equalizer, as described above, when the control loop diverges, the intermittent reset signal is sent to the adaptive matched filter 101 and the decision feedback equalizer 201 at the same time. Accordingly, when the control loop diverges under the condition $\rho > 1$, the distortion is so large for the decision feedback equalizer 201 that it cannot effect proper control.

If the control speed of the decision feedback equalizer 201 is first lowered in order to converge the adaptive matched filter 101, the converging characteristic of the decision feedback equalizer 201 is degraded. In any case, it is difficult to converge the control loop upon fading.

SUMMARY OF THE INVENTION

It is therefore an object of the present invention to provide an automatic equalizer which is capable of improving the converging characteristic of a control loop upon fading.

To achieve the above object, there is provided an automatic equalizer comprising an adaptive matched filter responsive to a first digital signal series for outputting a second digital signal series by symmetrizing asymmetrical impulse responses of the first digital signal series, a decision feedback equalizer responsive to the second digital signal series for outputting a third digital signal series by removing intersymbol interference from the second digital signal series, first means responsive to an asynchronism-detected signal for generating a first reset signal to control resetting of the adaptive matched filter and a second reset signal to control resetting of the decision feedback equalizer, and second means for outputting the first and second reset signals simultaneously and eliminating the second reset signal after eliminating the first reset signal.

The automatic equalizer may further include a demodulator for outputting an analog baseband signal and an analog-to-digital converter for sampling and quantizing the analog baseband signal into the first digital signal series, the demodulator including a synchronizing circuit for generating the asynchronism-detected signal.

The first and second means may comprise a reset control circuit having means for periodically generating the first and second reset signals and means for eliminating the second reset signal after eliminating the first reset signal.

Preferably, the reset control circuit may comprise a clock generator for generating a clock signal, an AND gate for logical multiplying the clock signal and the asynchronism-detected signal, a pair of resettable flip-flops responsive to an output signal from the AND gate for periodically outputting the first and second reset signals, respectively, and a pair of delay circuits connected respectively to output terminals of the flip-flops for supplying reset signals having different delay times to the respective reset terminals of the flip-flops.

With the above arrangement, when the control loop diverges, the demodulator is brought out of synchronism and the asynchronism-detected signal is outputted. In response to the asynchronism-detected signal, the reset control circuit applies the first reset signal to the adaptive matched filter and the second reset signal to the decision feedback equalizer. The adaptive matched filter and the decision feedback equalizer are simultaneously reset by the respective first and second reset signal. However, since the first reset signal is eliminated earlier than the second reset signal, the adaptive matched filter is first brought into the automatic equalizing mode, thereby symmetrizing impulse responses. Thereafter, the second reset signal is eliminated, causing the decision feedback equalizer to enter the automatic equalizing mode.

Consequently, inasmuch as the transition of the decision feedback equalizer into the automatic equalizing mode is effected after the adaptive matched filter has symmetrized impulse responses, the convergent characteristics of the control loop are improved at the time the amplitude ratio $\rho$ of reflected and direct waves is greater than 1.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
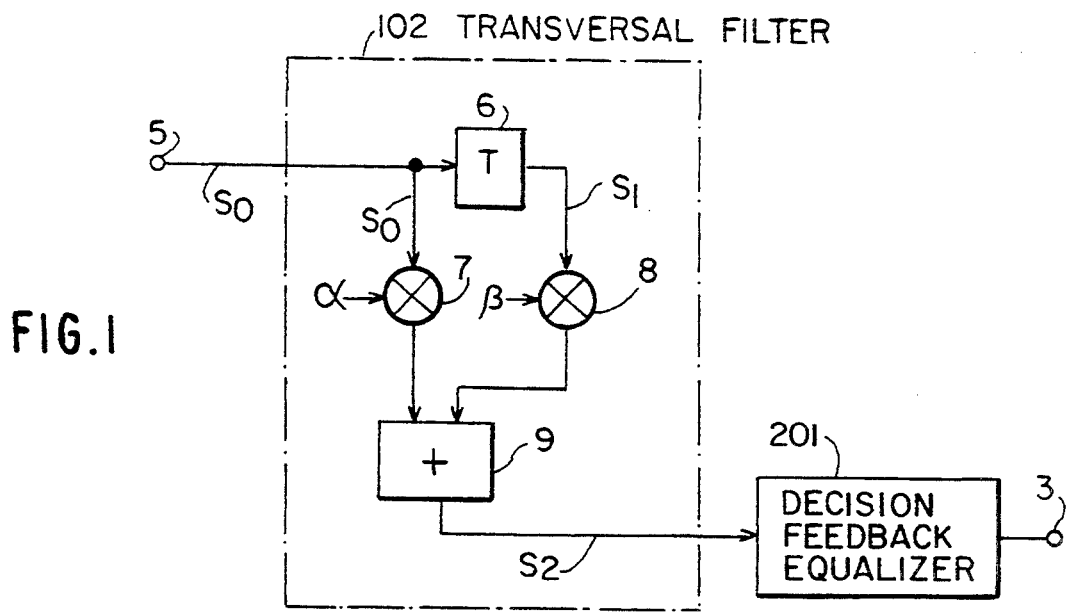
FIG. 1 is a block diagram of a fundamental circuit illustrative of the operating principles of an adaptive matched filter.
Figure 4:
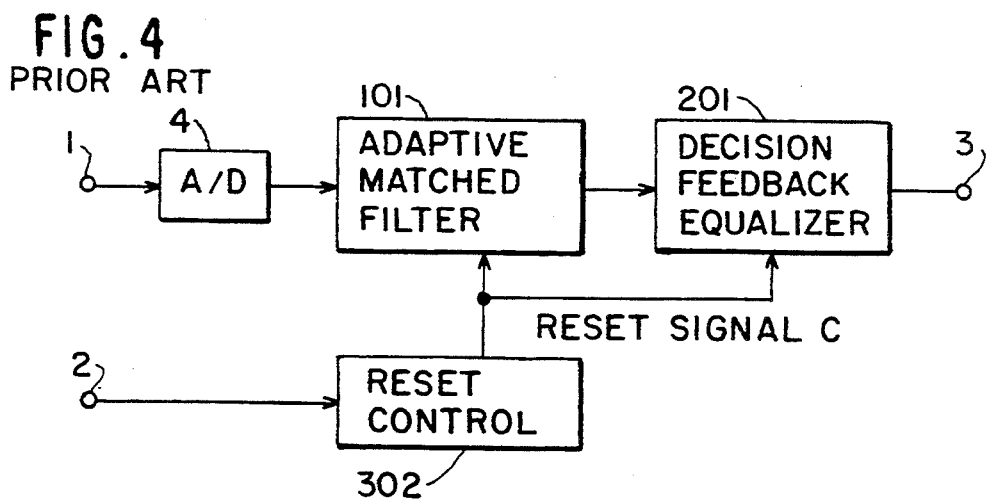
FIG. 4 is a block diagram of a conventional automatic equalizer.
Figure 5:
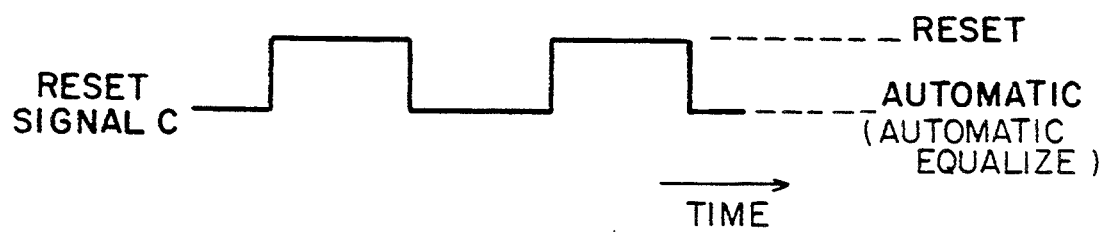
FIG. 5 is a timing chart of a reset signal produced in the conventional automatic equalizer.
Figure 2A:
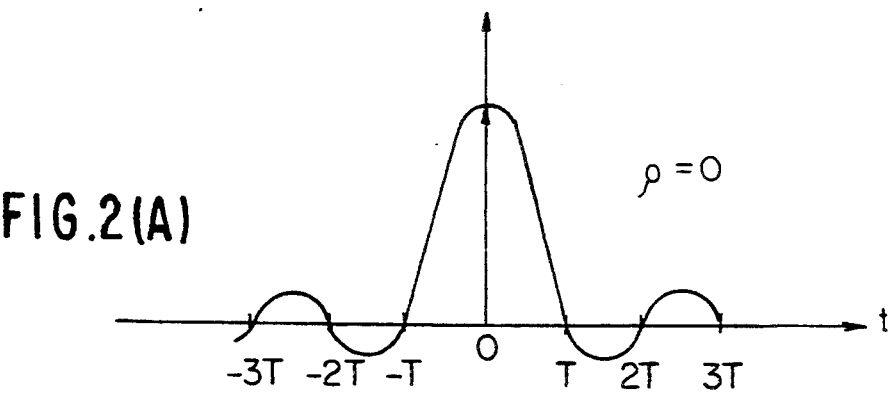
FIGS. 2(A) through 2(C) are diagrams showing the impulse response of the circuit shown in FIG. 1.
Figure 2B:
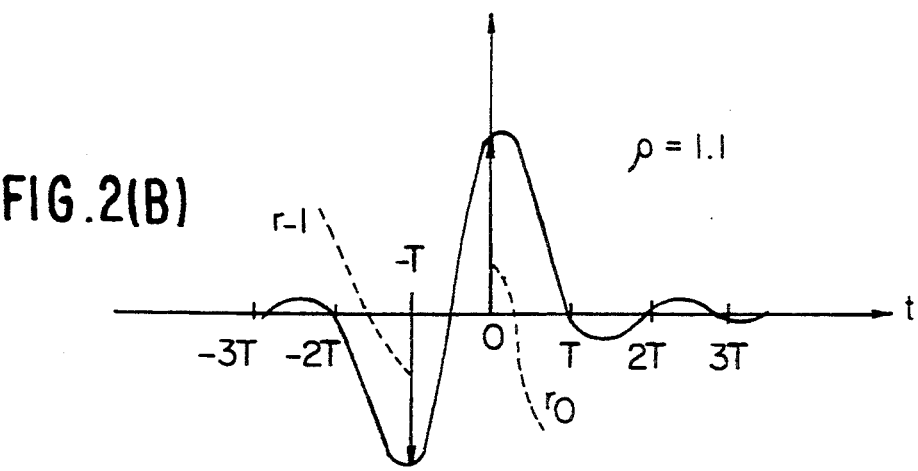
Figure 2C:
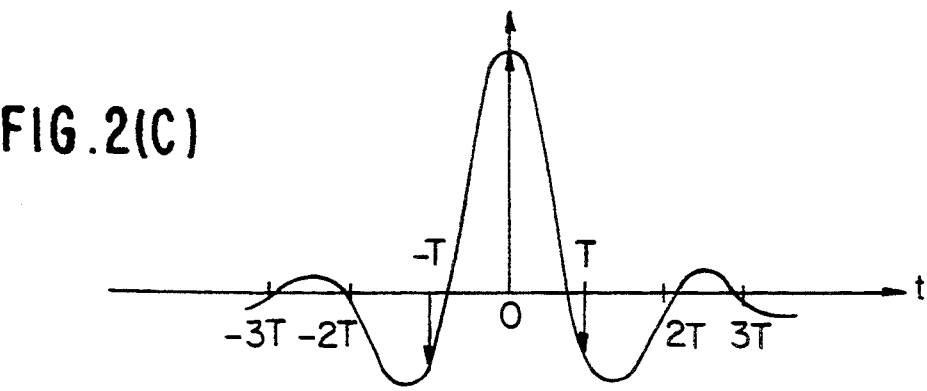
Figure 3A:
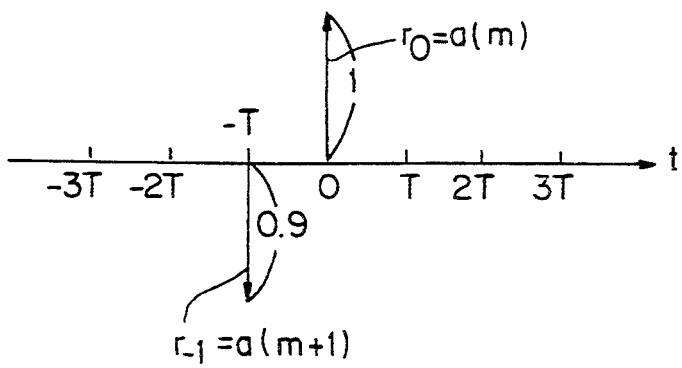
FIGS. 3(A) through 3(C) are diagrams illustrative of the relationship between principal and interfering waves.
Figure 3B:
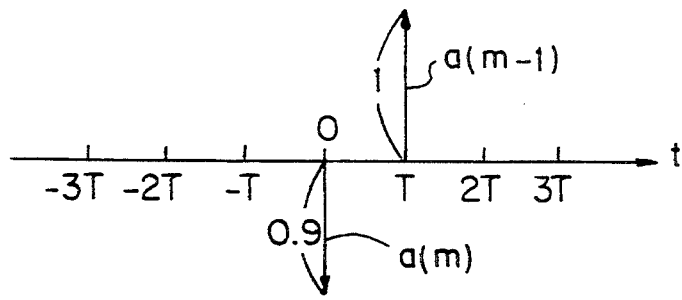
Figure 3C:
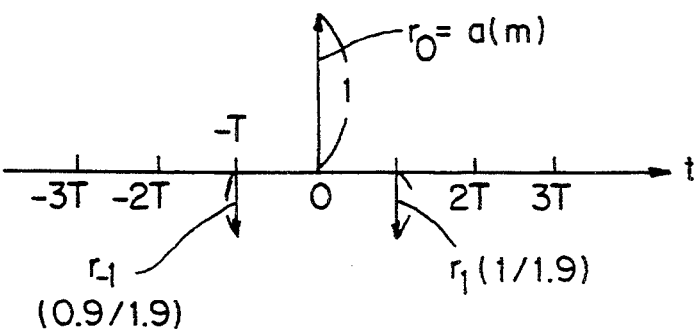
Figure 6:
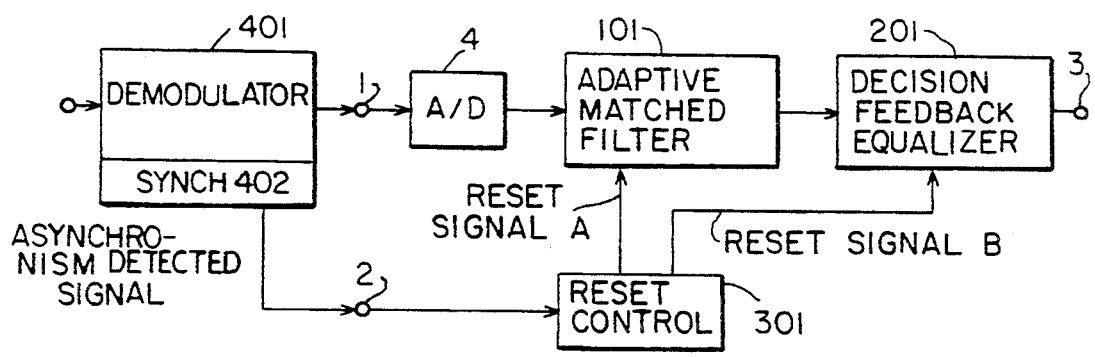
FIG. 6 is a block diagram of an automatic equalizer according to the present invention.

As shown in FIG. 6, an automatic equalizer according to the present invention comprises an adaptive matched filter 101 for receiving a first digital signal series produced when an analog baseband signal supplied from a demodulator 401 is sampled and quantized by an analog-to-digital (A/D) converter 4, and outputting a second digital signal series by symmetrizing asymmetric impulse responses of the first digital signal series; a decision feedback equalizer 201 for receiving the second digital signal series and outputting a third digital signal series by removing intersymbol interference from the second digital signal series; and a reset control circuit 301 for receiving an asynchronism-detected signal generated by a synchronizing circuit 402 in the demodulator 401 and outputting a first reset signal A which controls reset operation of the adaptive matched filter 101 and a second reset signal B which controls reset operation of the decision feedback equalizer 201, the second reset signal B being eliminated with a delay after the first reset signal A is eliminated.

Figure 7:
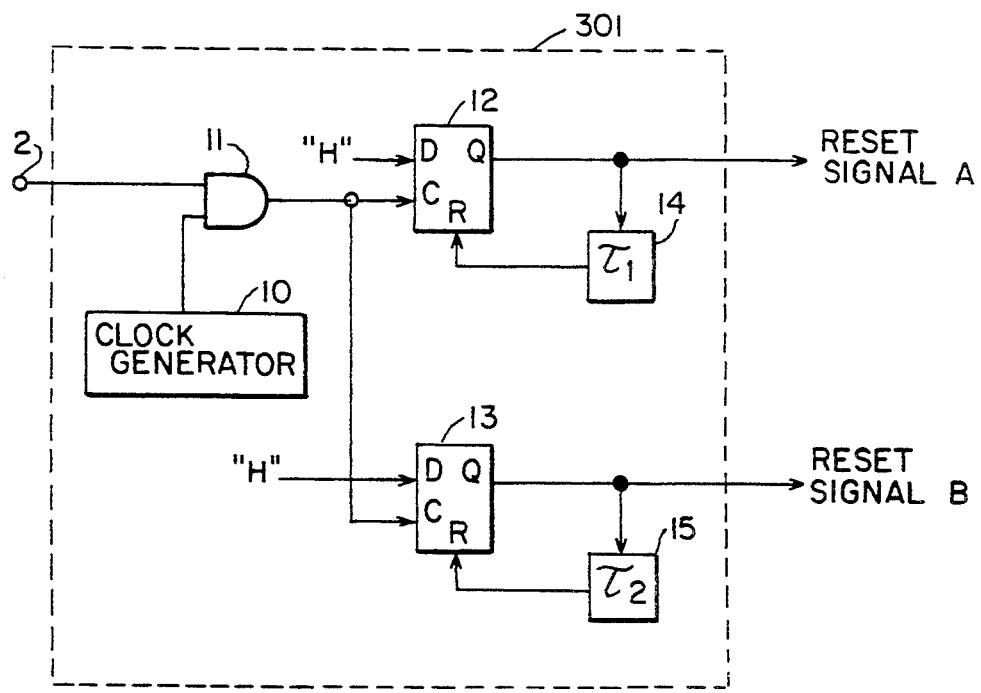
FIG. 7 is a block diagram of a reset control circuit in the automatic equalizer shown in FIG. 6.

As shown in FIG. 7, the reset control signal 301 has an input terminal 2 for receiving the asynchronism-detected signal, a clock generator 10 for generating a clock signal, an AND gate 11 for logical-multiplying the asynchronism-detected signal from the input terminal 2 and the clock signal from the clock generator 10, a pair of flip-flops 12, 13 connected to the output terminal of the AND gate 11 for outputting the first and second reset signals, and a pair of delay circuits 14, 15 connected respectively to the flip-flops 12, 13 and having different delay times $\tau_1$, $\tau_2$ ($\tau_1 < \tau_2$).

The asynchronism-detected signal supplied from the input terminal 2 is of "H" (high) level when an asynchronous condition is detected, and of "L" (low) level when a synchronous condition is detected. Therefore, when the synchronous condition is detected, the AND gate 11 produces an output signal "L", and when the asynchronous condition is detected, the AND gate 11 passes the clock signal generated by the clock generator 10. Since a signal "H" is inputted to a data input terminal D of each of the flip-flops 12, 13, the flip-flops 12, 13 output a signal "H" as the first and second reset signals from respective output terminals Q in response to a positive-going edge of the clock signal that is inputted to clock terminals C thereof when the asynchronous condition is detected. Upon elapse of the delay times $\tau_1$, $\tau_2$ after the flip-flops 12, 13 output the signal "H" from the output terminals Q, the delay circuits 14, 15 apply a signal "H" to reset terminals R of the flip-flops 12, 13, which then output a signal "L" from their output terminals Q, thus eliminating the first and second reset signals.

Operation of the automatic equalizer according to the present invention will be described below.

In the conventional equalizer, when the control loop converges, the adaptive matched filter 101 and the decision feedback equalizer 201 are reset by the single reset signal C. According to the present invention, however, the automatic equalizer employs the first and second reset signals A and B for resetting the adaptive matched filter 101 and the decision feedback equalizer 201, respectively.

Figure 8:
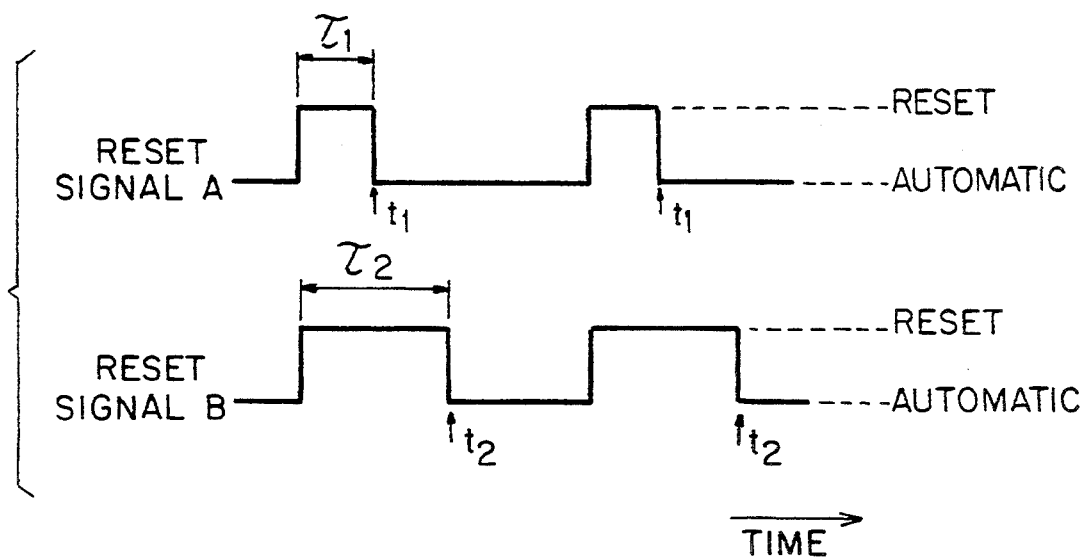
FIG. 8 is a timing chart of reset signals produced in the automatic equalizer shown in FIG. 6.

More specifically, as shown in FIG. 8, when the asynchronism-detected signal is inputted at the time the control loop diverges, the reset control circuit 301 intermittently generates two reset signals, i.e., the first reset signal A which has a duration $\tau_1$ and the second reset signal B which has a duration $\tau_2$, and the adaptive matched filter 101 and the decision feedback equalizer 201 are reset by the first and second reset signals A, B, respectively.

After the elapse of time $\tau_1$ after the positive-going edge of the first and second reset signals A, B, the first reset signal A is eliminated, bringing the adaptive matched filter 101 into an automatic equalizing mode to symmetrize impulse responses. Then, after elapse of the time $\tau_2$, which is longer than the time $\tau_1$, the second reset signal B is eliminated, bringing the decision feedback equalizer 201 into the automatic equalizing mode. This status transition between the reset condition and the automatic equalizing mode is repeated until the control loop converges. The adaptive matched filter 101 and the decision feedback equalizer 201 are maintained in the automatic equalizing mode when the control loop has converged.

According to the present invention, as described above, when the control loop diverges, the adaptive matched filter and the decision feedback equalizer are simultaneously reset, and thereafter only the adaptive matched filter is brought into the automatic equalizing mode to symmetrize impulse responses, following which the decision feedback equalizer is brought into the automatic equalizing mode. Therefore, convergence is enabled for a control loop which has diverged due to fading that can be equalized, not by the decision feedback equalizer alone, but by the combination of the adaptive matched filter and the decision feedback equalizer, when the amplitude ratio of the reflected and direct waves is greater than 1.

It is to be understood that variations and modifications of the automatic equalizer disclosed herein will be evident to those skilled in the art. It is intended that all such modifications and variations be included within the scope of the appended claims.

What is claimed is:

1. An automatic equalizer comprising:

an adaptive matched filter responsive to a first digital signal series for outputting a second digital signal series by symmetrizing asymmetrical impulse responses of the first digital signal series;

a decision feedback equalizer responsive to said second digital signal series for outputting a third digital signal series by removing intersymbol interference from said second digital signal series;

first means responsive to an asynchronism-detected signal for generating a first reset signal to control resetting of said adaptive matched filter and a second reset signal to control resetting of said decision feedback equalizer; and second means for outputting said first and second reset signals simultaneously and eliminating said second reset signal after eliminating said first reset signal.

2. The automatic equalizer according to claim 1, further including an analog-to-digital converter for sampling and quantizing an analog baseband signal to produce said first digital signal series, and a demodulator, including a synchronizing circuit for generating said asynchronism-detected signal, for generating said analog baseband signal.

3. The automatic equalizer according to claim 2, wherein said first and second means comprise a reset control circuit having means for periodically generating said first and second reset signals and means for eliminating said second reset signal after eliminating said first reset signal.

4. The automatic equalizer according to claim 3, wherein said reset control circuit comprises a clock generator for generating a clock signal; an AND gate for logical multiplying said clock signal and said asynchronism-detected signal; a pair of resettable flip-flops responsive to an output signal from said AND gate for periodically outputting the first and second reset signals, respectively; and a pair of delay circuits connected respectively to output terminals of said flip-flops for supplying reset signals having different delay times to respective reset terminals of said flip-flops.

* * * * *